US008972769B2

(12) United States Patent
Nakagawa et al.

(10) Patent No.: US 8,972,769 B2
(45) Date of Patent: Mar. 3, 2015

(54) DATA PROCESSING APPARATUS AND CONTROL METHOD FOR CONTROLLING CLOCK FREQUENCY BASED ON CALCULATED FREQUENCY-TO-RESPONSE-TIME RATIOS

(75) Inventors: Akio Nakagawa, Yokohama (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 13/011,712

(22) Filed: Jan. 21, 2011

(65) Prior Publication Data

US 2011/0197089 A1    Aug. 11, 2011

(30) Foreign Application Priority Data

Feb. 9, 2010 (JP) .................................. 2010-026998
Nov. 11, 2010 (JP) .................................. 2010-252956

(51) Int. Cl.
*G06F 1/04* (2006.01)
*G06F 15/16* (2006.01)
*G06F 9/30* (2006.01)
*G06F 9/40* (2006.01)
*G06F 9/00* (2006.01)
*G06F 1/32* (2006.01)

(52) U.S. Cl.
CPC .............. *G06F 1/3203* (2013.01); *G06F 1/324* (2013.01); *Y02B 60/1217* (2013.01)
USPC ........... 713/600; 713/375; 712/200; 712/201; 712/220

(58) Field of Classification Search
None
See application file for complete search history.

(56) References Cited

U.S. PATENT DOCUMENTS

| 5,715,457 | A   | 2/1998  | Wakatani |
| 5,937,167 | A   | 8/1999  | Arimilli et al. |
| 6,874,098 | B2* | 3/2005  | Tamemoto et al. ........... 713/500 |
| 6,928,566 | B2* | 8/2005  | Nunomura .................... 713/322 |
| 6,963,989 | B1* | 11/2005 | Cullum et al. ................ 713/401 |
| 7,895,251 | B2  | 2/2011  | Ishikawa |
| 2004/0098631 | A1 | 5/2004 | Terrell, II |
| 2007/0124730 | A1* | 5/2007 | Pytel ............................. 718/100 |
| 2009/0044038 | A1* | 2/2009 | Lee ............................... 713/501 |
| 2010/0131791 | A1* | 5/2010 | Kimura ......................... 713/340 |
| 2012/0233488 | A1* | 9/2012 | Burchard et al. ............. 713/500 |

FOREIGN PATENT DOCUMENTS

CN    1221918 A    7/1999
JP    6-202999 A   7/1994

(Continued)

OTHER PUBLICATIONS

Korean Office Action dated Jun. 18, 2013 issued in corresponding Korean Patent Application No. 10-2011-0010462.

(Continued)

*Primary Examiner* — Ji H Bae
(74) *Attorney, Agent, or Firm* — Fitzpatrick, Cella, Harper & Scinto

(57) ABSTRACT

A data processing apparatus includes: a plurality of processing units adapted to process data according to input operation clocks; and a control unit adapted to measure response times of the plurality of processing units when the operation clocks of a common frequency are supplied to the plurality of processing units, and to control a frequency of the operation clocks to be supplied to at least one of the plurality of processing units so that a plurality of measured response times become closer to each other.

9 Claims, 4 Drawing Sheets

(56) References Cited

FOREIGN PATENT DOCUMENTS

| | | |
|---|---|---|
| JP | 2003-99148 A | 4/2003 |
| JP | 2005-85164 A | 3/2005 |
| JP | 2006-212936 A | 8/2006 |
| JP | 2006-285719 A | 10/2006 |

OTHER PUBLICATIONS

Chinese Office Action dated May 8, 2013 issued in corresponding Chinese Patent Application No. 201110035992.8.
Japanese Office Action dated Aug. 11, 2014 issued in corresponding Japanese Patent Application No. 2010-252956.

* cited by examiner

DATA PROCESSING APPARATUS AND CONTROL METHOD FOR CONTROLLING CLOCK FREQUENCY BASED ON CALCULATED FREQUENCY-TO-RESPONSE-TIME RATIOS

BACKGROUND OF THE INVENTION

1. Field of the Invention

The present invention relates to a data processing apparatus and control method thereof and, more particularly, to a technique for reducing power consumption while suppressing the processing response performance of multi-core processing from lowering.

2. Description of the Related Art

As described in Japanese Patent Laid-Open No. 2006-285719, in a ring type bus connection system having a plurality of processing execution modules, the respective processing execution modules include local memories to avoid occurrence of access wait statuses to the memories. With this arrangement, data processing can be efficiently executed with small power consumption.

However, in the arrangement of Japanese Patent Laid-Open No. 2006-285719, when a processing response time difference is generated between the processing execution modules, a module having a shorter processing response time completes processing earlier than a module having a longer processing response time. In this case, for example, generation of a leakage current in an idle time results in wasteful power consumption. Also, in the arrangement of Japanese Patent Laid-Open No. 2006-285719, in order to attain a further power consumption reduction, the operating frequency of the overall system has to be lowered. However, when the operating frequency of the overall system is lowered, the performance of the entire system is also lowered.

SUMMARY OF THE INVENTION

The present invention has been made in consideration of the aforementioned problems, and aims to provide a technique to reduce power consumption while suppressing the multi-core processing performance of a data processing circuit from lowering.

According to one aspect of the present invention, a data processing apparatus includes: a plurality of processing units adapted to process data according to input operation clocks; and a control unit adapted to measure response times of the plurality of processing units when the operation clocks of a common frequency are supplied to the plurality of processing units, and to control a frequency of the operation clocks to be supplied to at least one of the plurality of processing units so that a plurality of measured response times become closer to each other.

According to another aspect of the present invention, a data processing apparatus in which a plurality of data processing modules which execute data processing in a pre-set order are connected in a ring shape, includes: a measurement unit adapted to measure a response time of the data processing in association with each of the plurality of data processing modules; a calculation unit adapted to calculate a frequency-to-response time ratio as a ratio of an operating frequency to the measured response time of the data processing module of interest in association with each of the plurality of data processing modules; and a control unit adapted to control the operating frequencies of the plurality of data processing modules based on the calculated frequency-to-response time ratios, wherein the control unit controls the operating frequencies of other data processing modules so that the frequency-to-response time ratios of other data processing modules become closer to the data processing modules of the data processing module corresponding to the largest measured response time of the plurality of data processing modules.

According to still another aspect of the present invention, a control method of a data processing apparatus in which a plurality of data processing modules which execute data processing in a pre-set order are connected in a ring shape, includes: a measurement step of controlling a measurement unit to measure a response time of the data processing in association with each of the plurality of data processing modules; a calculation step of controlling a calculation unit to calculate a frequency-to-response time ratio as a ratio of an operating frequency to the measured response time of the data processing module of interest in association with each of the plurality of data processing modules; and a control step of controlling a control unit to control the operating frequencies of the plurality of data processing modules based on the calculated frequency-to-response time ratios, wherein in the control step, the operating frequencies of other data processing modules are controlled so that the frequency-to-response time ratios of other data processing modules become closer to the data processing modules of the data processing module corresponding to the largest measured response time of the plurality of data processing modules.

Further features of the present invention will become apparent from the following description of exemplary embodiments (with reference to the attached drawings).

DESCRIPTION OF THE EMBODIMENTS

Embodiments of the present invention will be described in detail hereinafter with reference to the accompanying drawings.

<First Embodiment>

(Data Processing Subsystem)

Figure 1:
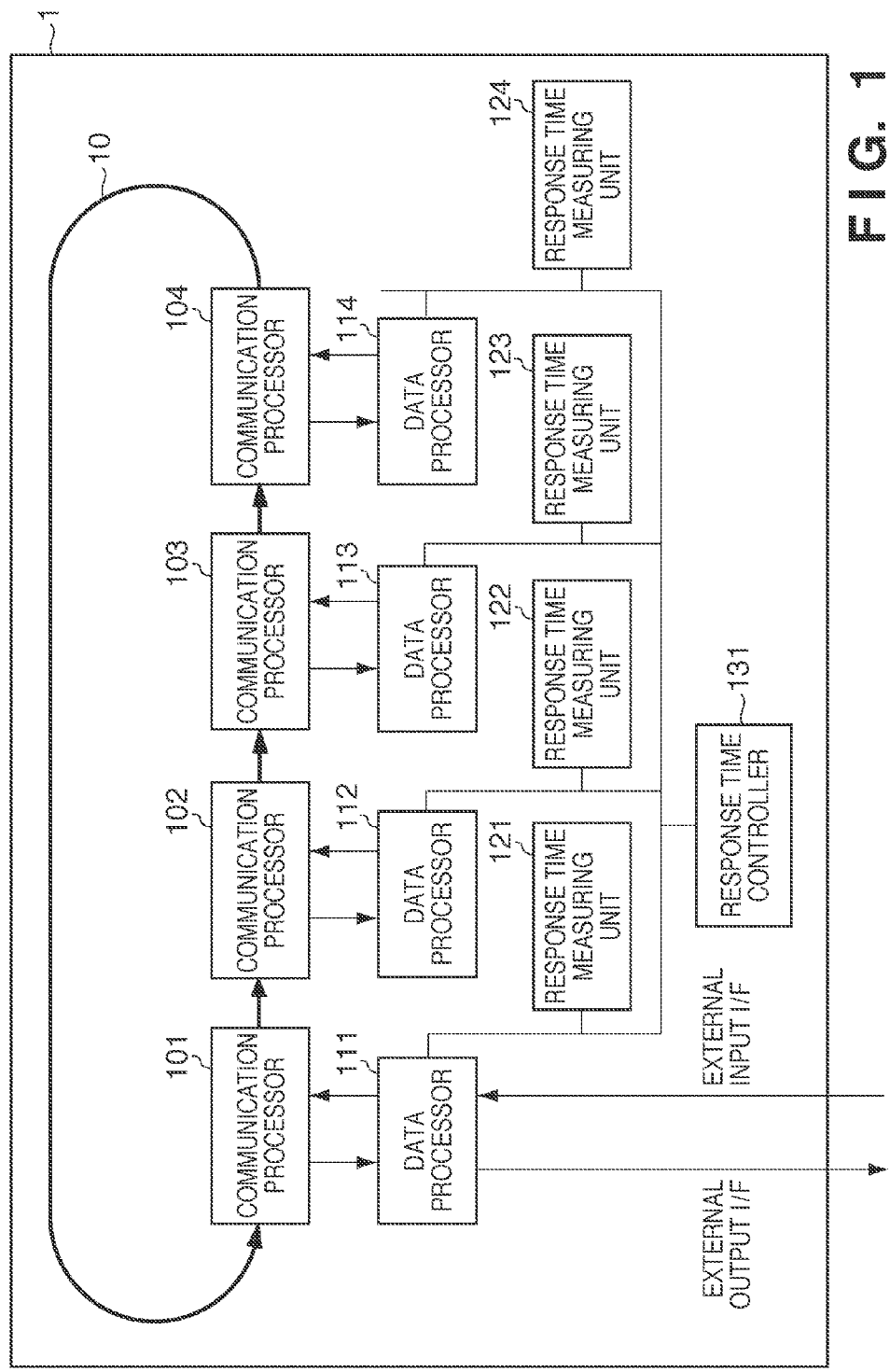
FIG. 1 is a block diagram showing the arrangement of a data processing subsystem.

Basic explanations about individual components of a data processing subsystem according to this embodiment, a mutual relationship with peripheral components, and the data processing sequence will be given first. FIG. 1 is a block diagram showing the arrangement of a data processing subsystem 1 as a data processing apparatus according to this embodiment.

The data processing subsystem 1 includes a communication path 10, communication processors 101, 102, 103, and 104, data processors (data processing modules) 111 to 114, response time measuring units 121 to 124, and response time controller 131. As shown in FIG. 1, in the data processing subsystem 1, the plurality of data processors for executing data processing in a pre-set order are connected to the communication processors 101 to 104, which are connected in a ring shape to have one-to-one correspondence with each other. When the plurality of data processors execute data processing in the pre-set order, the data processing subsystem 1 can implement multi-core processing by assigning respective stages of pipeline processing to the respective data processors.

Each of the communication processors 101 to 104 executes format conversion of information between the communication path 10 and a corresponding one of the data processors 111 to 114, and exchanges information between the communication path 10, another communication processor, and the corresponding data processor. Each of the data processors 111 to 114 executes predetermined data processing for the received information, and passes the processing result to a corresponding one of the communication processors 101 to 104. Each of the data processors 111 to 114 executes processing in accordance with supplied operation clocks.

The data processor 112 exchanges data with the corresponding communication processor 102. Likewise, the data processors 113 and 114 exchange data with the corresponding communication processors 103 and 104, respectively. Note that the data processor 111 as data input and output terminals with an external system receives data from the outside of the data processing subsystem 1, and passes the data to the communication processor 101 after data processing. Also, the data processor 111 receives data from the communication processor 101, and outputs the data to the outside of the data processing subsystem 1 after data processing.

Data input from the data processor 111 is passed to the communication processor 101, and is converted into information in a format that flows on the communication path 10. The converted information is then transferred in a ring shape like the communication processor 101→102→103→104→101→ . . . . During this process, the data is passed from the communication processor to the data processor, and undergoes data processing. The processed data is passed to the communication processor again. In this sequence, the data processing is executed. Each of the communication processors 101 to 104 has a flip-flop (not shown) having a FIFO arrangement, and shifts data to the communication processor in the direction of an arrow for each cycle time. Hence, paying attention to the communication processors 101 to 104, they serve as a ring type shift register. As an example of the conversion format of the data processor 111, data may be divided into those each having a predetermined data size, or transmission information may be appended to data to packetize the data. In the subsequent example, the following description will be given using an example in which data is divided into those each having a fixed length for the sake of descriptive simplicity.

When data is passed from the communication processor to the data processor, the data processor may fail to receive the next data since processing of the previously received data is still underway. A status of the data processor at that time is called a hold status.

The response time measuring unit 121 measures, as a response time, a time from a timing at which the data processor receives data from the communication processor and starts data processing until a timing at which the data processor completes the data processing. In this way, the response time measuring unit 121 measures a response time of the data processor 111. Likewise, the response time measuring units 122, 123, and 124 respectively measure response times of the corresponding data processors 112, 113, and 114.

The response time controller 131 controls operating frequencies to be supplied to the data processors 111 to 114, and acquires hold statuses of the data processors 111 to 114. Also, the response time controller 131 acquires the response times from the response time measuring units 121 to 124.

(Operating frequency Control)

The operating frequency control of the data processors 111 to 114 by the response time controller 131 will be described below. Immediately after the data processing subsystem 1 is started up, the response time controller 131 supplies an identical frequency to the data processors 111 to 114. The frequency to be commonly supplied to all the data processors 111 to 114 at the startup timing is called a reference frequency Fbase. Therefore, letting fn be an individual frequency to be supplied to a data processor n ($111 \leq n \leq 114$), fn=Fbase immediately after the data processing subsystem 1 is started up.

The response time measuring units 121 to 124 respectively calculate response times rn ($111 \leq n \leq 114$) of the data processors 111 to 114 in this state, and transfer them to the response time controller 131. In this case, assume that the response times are varied for respective data processors, and a response time r111 of the data processor 111=R, a response time r112 of the data processor 112=R, a response time r113 of the data processor 113=2R, and a response time r114 of the data processor 114=4R.

The response time controller 131 calculates frequency-to-response time ratios fn/rn for the respective data processors, and derives a minimum ratio fn/rn (to be referred to as a minimum frequency-to-response time ratio (f/r)min hereinafter) from these ratios. In case of this embodiment, f111/r111=Fbase/R, f112/r112=Fbase/R, f113/r113=Fbase/2R, and f114/r114=Fbase/4R. Therefore, (f/r)min=f114/r114=Fbase/4R.

Next, the response time controller 131 calculates an optimized frequency fn' for each of the ratios fn/rn other than (f/r)min, so that the frequency-to-response time ratio assumes a neighborhood value of the minimum frequency-to-response time ratio like fn'/rn≈(f/r)min by decreasing the value of fn. Then, the response time controller 131 supplies the optimized frequency fn' as an operating frequency of each data processor again. In this embodiment, the response time controller 131 supplies f111'=Fbase/4 to the data processor 111, f112'=Fbase/4 to the data processor 112, and f113'=Fbase/2 to the data processor 113.

(Basic Processing)

Figure 2:
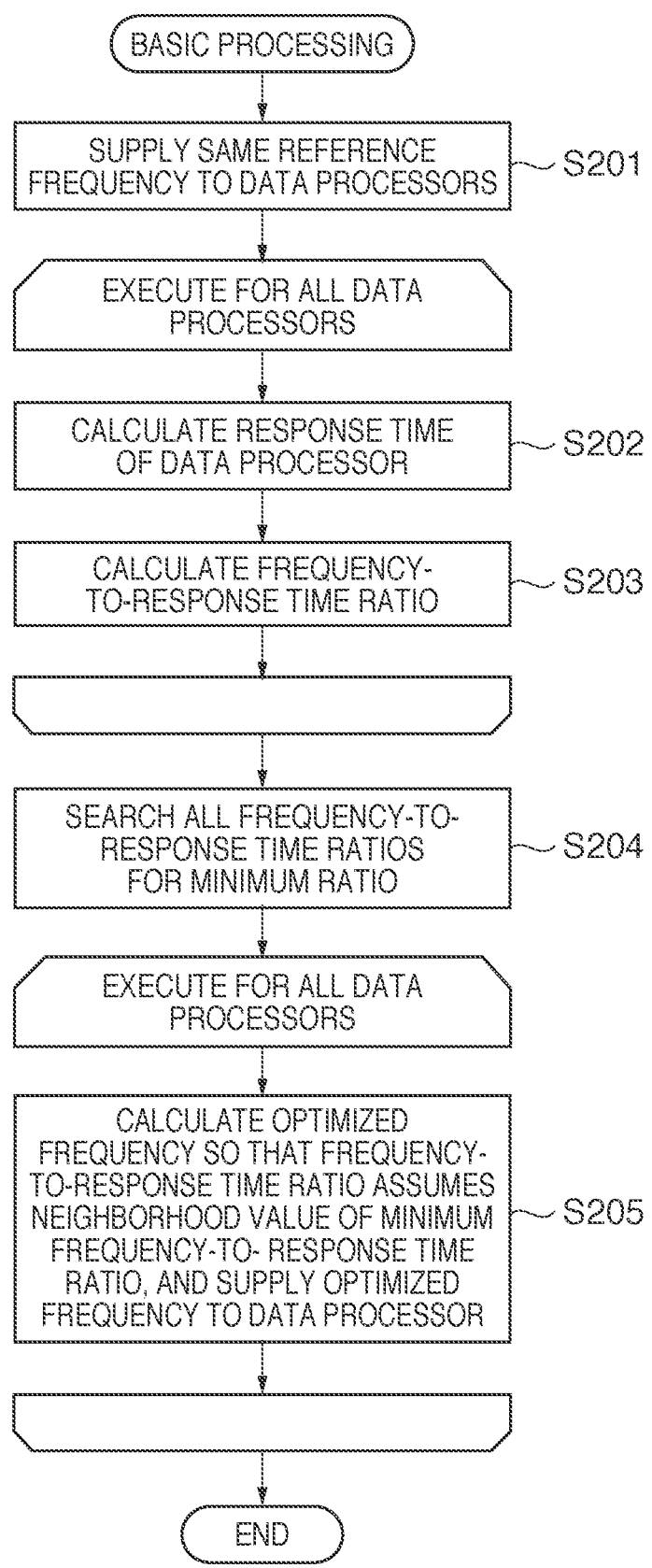
FIG. 2 is a flowchart showing the basic processing sequence for supplying optimized frequencies.

The sequence of basic processing from when the response time controller 131 in the data processing subsystem of this embodiment sets the reference frequency Fbase until it re-sets the respective optimized frequencies fn' will be described below with reference to FIG. 2. FIG. 2 is a flowchart showing the sequence of the basic processing by the response time controller 131 and the response time measuring units 121 to 124.

In step S201, the response time controller 131 commonly supplies the reference frequency Fbase to the data processors 111 to 114. In step S202, the response time measuring units 121 to 124 calculate response times rn of the data processors 111 to 114, and transfer them to the response time controller 131. In step S203, the response time controller 131 calculates frequency-to-response time ratios fn/rn for the respective data processors 111 to 114. In step S204, the response time controller 131 derives a minimum ratio (f/r)min from all the ratios fn/rn. In step S205, the response time controller 131 calculates optimized frequencies fn' for the ratios fn/rn other than the radio (f/r)min so that each frequency-to-response time ratio assumes a neighborhood value of the minimum frequency-to-response time ratio like fn'/rn≈(f/r)min by reducing the value of fn. Furthermore, the response time controller 131 supplies the calculated frequencies fn' to the data processors 111 to 114. In this way, the basic processing ends.

As described above, according to this embodiment, when respective processing execution modules have processing response time differences, the optimized frequencies fn' with which the frequency-to-response time ratios assume neighborhood values of the minimum value are calculated for the respective data processors, and are supplied to the respective data processors. That is, when pipeline processing is executed using a plurality of data processing modules having various processing performances, the operating frequencies of other data processing modules are reduced in correspondence with the operation performance of the data processing module having the lowest processing performance. For this reason, according to this embodiment, the consumption power can be reduced while suppressing the processing response performance of a pipeline processing circuit from lowering.

<Second Embodiment>

Another embodiment associated with frequency control in the response time controller 131 when a hold status has occurred in one (the data processor 113 in this embodiment) of the data processors connected in a ring shape will be described below. Note that the basic arrangement of the system of this embodiment is the same as that of the first embodiment, and the processing until the settings of the optimized frequencies fn' is complete.

Information of a hold status which has occurred in the data processor 113 is sent to the response time controller 131. The response time controller 131 compares the frequency f113=Fbase/2 of the data processor 113 with Fbase. In the above example, since f113<Fbase, the response time controller 131 temporarily supplies Fbase to the data processor 113.

As described above, in this embodiment, when the operating frequencies of the data processing modules are controlled, and when a hold status has occurred in one of the data processing modules, the operating frequency of that data processing module is controlled to be the reference frequency until the hold status is released. For this reason, the data processing module (data processor 113) that has caused the hold status can execute data processing quicker, thus shortening the hold status.

After the hold status is released, the response time controller 131 supplies the optimized frequency f113=Fbase/2 to the data processor 113 again. For this reason, the processing response performance of the pipeline processing circuit can be dynamically suppressed from being lowered, as compared with the first embodiment. Also, at the same time, the operating frequencies of the processing modules located on the upstream of the processing module that has caused the hold status may be suppressed. In this way, occurrence of a new hold status can be suppressed, and the power consumption of the upstream processing modules can be reduced. When the hold status is released, the suppressed operating frequencies are reverted to the original operating frequencies.

<Third Embodiment>

Still another embodiment associated with frequency control in the response time controller 131 when a hold status has occurred in the data processor 114 will be described below. Note that the basic arrangement of the system of this embodiment is the same as that of the first embodiment, and the processing until the settings of the optimized frequencies fn' is complete.

Information of a hold status that has occurred in the data processor 114 is sent to the response time controller 131. The response time controller 131 compares the frequency f114=Fbase of the data processor 114 with Fbase. Since f114=Fbase, the response time controller 131 cannot raise clocks supplied to the data processor 114 any more.

In this case, the response time controller 131 temporarily supplies clocks whose frequencies are further reduced from their optimized frequencies fn' to the data processors (those other than the data processor 114 in this embodiment) on the upstream of the data processor 114 (that which has caused the hold status). In this way, since the processing of the upstream data processors is slowed down, occurrence of a new hold status in the data processor 114 can be suppressed, and the data processing efficiency can be relatively improved although the processing speed of the data processor 114 itself remains unchanged, thus shortening the hold status. After the hold status is released, the response time controller 131 supplies the optimized frequencies fn' to the upstream data processors (those other than the data processor 114) again.

Figure 3:
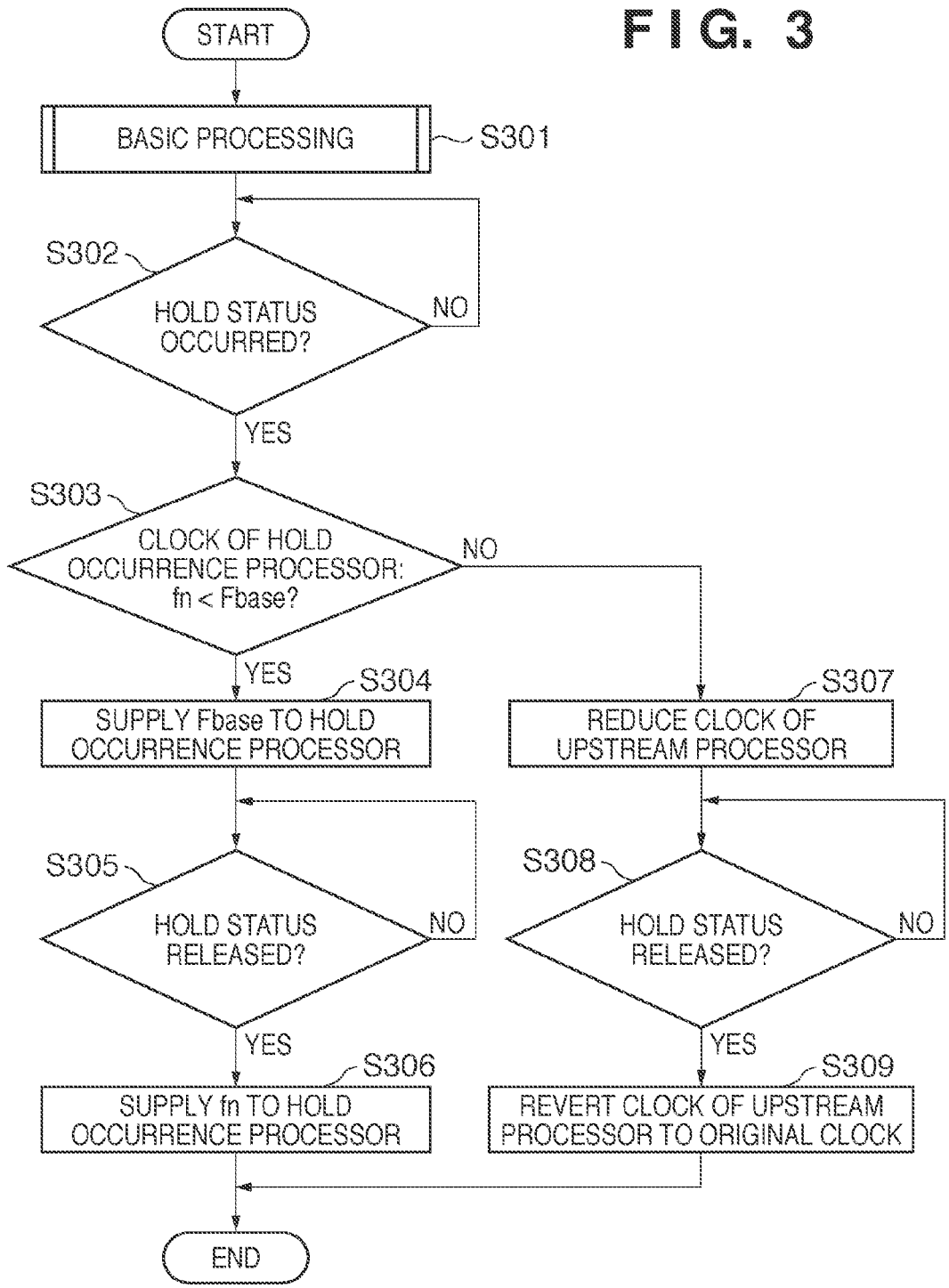
FIG. 3 is a flowchart showing the processing sequence when a hold status has occurred.

FIG. 3 is a flowchart showing the sequence of the processing of both the second and third embodiments. Step S301 shows, as a subroutine, that processing is executed until supply of the optimized frequencies fn' in the first embodiment, for the sake of convenience.

The response time controller 131 monitors in step S302 if a hold status occurs. If a hold status has occurred in one of the data processors, the process advances to step S303. In step S303, the response time controller 131 compares the frequency fn supplied to the data processor which has caused the hold status with Fbase. If fn<Fbase (YES in step S303), the process advances to step S304; if fn=Fbase (NO in step S303), the process advances to step S307.

In step S304, the response time controller 131 supplies Fbase to the data processor which has caused the hold status. The response time controller 131 monitors in step S305 if the hold status of the data processor which has caused the hold status is released. If the hold status is released, the process advances to step S306. In step S306, the response time controller 131 supplies the optimized frequency fn' to the data processor which has caused the hold status again, thus ending the flowchart.

On the other hand, in step S307 the response time controller 131 supplies a frequency which is further reduced from the optimized frequency fn' to each data processor on the upstream of the data processor which has caused the hold status. The response time controller 131 monitors in step S308 if the hold status of the data processor which has caused the hold status is released. If the hold status is released, the process advances to step S309. In step S309, the response time controller 131 supplies, again, the optimized frequency fn' to each data processor on the upstream of the data processor which has caused the hold status, thus ending the flowchart.

As described above, in this embodiment, when the operating frequencies of the data processing modules are controlled, and when a hold status has occurred in one of the data processing modules, it is determined whether or not the operating frequency of that data processing module is less than the reference frequency. If the operating frequency is less than the reference frequency, since the operating frequency of the data processing module of interest is controlled to be the reference frequency until the hold status is released as in the second embodiment, the hold status can be shortened. On the other hand, if the operating frequency is equal to the reference frequency, the operating frequency of each data processing module on the upstream of the data processing module, which has caused the hold state, is reduced. Note that when data is not output to the data processing modules on the downstream of the data processing module that has caused the hold status, the operating frequency of each downstream data processing module may be reduced in addition to the upstream data processing modules. In this case, since the number of data processing modules whose operating frequencies are to be reduced is increased, the power consumption can be further reduced.

As described above, according to this embodiment, when a hold status has occurred in the data processing module, the power consumption can be reduced by adaptively changing the operating frequency while shortening a recovery time from the hold status.

<Fourth Embodiment>

Yet another embodiment associated with frequency control of the response time controller 131 when a hold status has occurred in the data processor 113 will be described below. Note that the basic arrangement of the system of this embodiment is the same as that of the first embodiment, and the processing until the settings of the optimized frequencies fn' is complete. Assume that in this embodiment, the data processors 112 and 114 are not used, and no clocks (or power supply voltages) are supplied to these two data processors 112 and 114.

Information of the hold status which has occurred in the data processor 113 is sent to the response time controller 131. The response time controller 131 replaces the reference frequency Fbase by an upper limit Fmax of an operable frequency. The upper limit Fmax of the operable frequency is calculated from values (table) or coefficients described in, for example, a ROM (not shown) at the time of delivery inspection of a chip based on the temperature or power consumption of the chip. In this embodiment, since the two data processors 112 and 114 are inactive, as described above, and the power consumption (temperature) of the chip lowers, the upper limit Fmax of the operable frequency assumes a slightly large value.

On the other hand, the response time controller 131 temporarily supplies clocks whose frequency is further reduced from the optimized frequency fn' to the data processor (the data processor 111 in this embodiment; note that no clocks are supplied to the data processor 112 since it is inactive) on the upstream of the data processor 113 which has caused the hold status. As a result, since the processing of the upstream data processor is slowed down, occurrence of a new hold status in the data processor 113 can be suppressed, and the data processing efficiency can be relatively improved, thus shortening the hold status. After the hold status is released, the response time controller 131 supplies the optimized frequency fn' to the upstream data processor (data processor 111) again, and restores the reference frequency from Fmax to Fbase.

Figure 4:
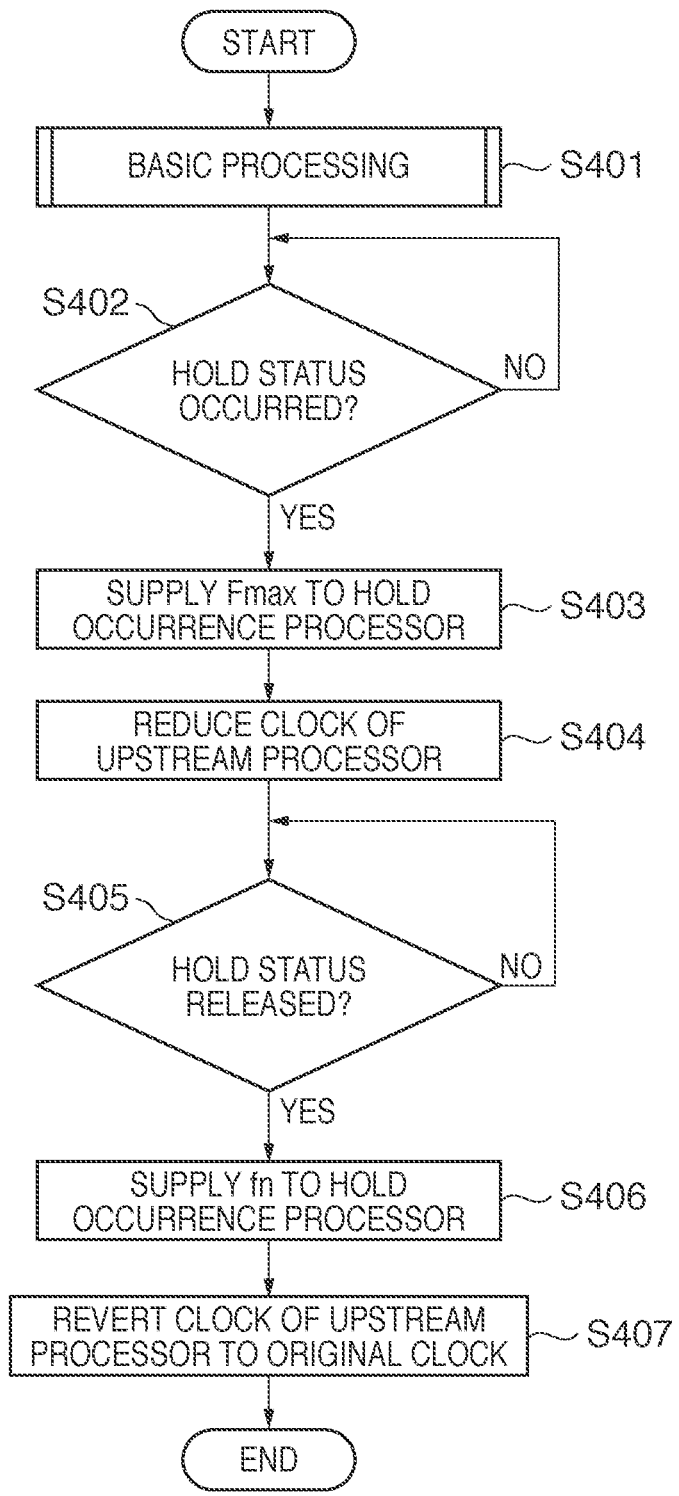
FIG. 4 is a flowchart showing the processing sequence when a hold status has occurred according to the fourth embodiment.

FIG. 4 is a flowchart showing the sequence of the processing of the fourth embodiment. Step S401 shows, as a subroutine, that processing is executed until supply of the optimized frequencies fn' in the first embodiment, for the sake of convenience.

The response time controller 131 monitors in step S402 if a hold status occurs in each of the data processors. If a hold status has occurred, the process advances to step S403. In step S403, the response time controller 131 supplies clocks of the frequency Fmax to the data processor which has caused the hold status. On the other hand, the response time controller 131 reduces the clock frequency of the data processor (the data processor 111 in this embodiment) located on the upstream (S404).

The response time controller 131 monitors in step S405 if the hold status of the data processor, which has caused the hold status, is released. If the hold status is released, the process advances to step S406. In step S406, the response time controller 131 supplies the original optimized frequency fn' as the clock frequency of the data processor which has caused the hold status again. Also, the response time controller 131 reverts the clock frequency of the upstream data processor (the data processor 111 in this embodiment) to the original frequency (S407). After all the frequencies are reverted, the processing ends.

In this embodiment, when the operating frequencies of the data processing modules are controlled, and when a hold status has occurred in one of the data processing modules, the operating frequency of that data processing module is set to be the upper limit Fmax of the operable frequency. For this reason, the hold status can be further shortened. On the other hand, the operating frequency of the data processor on the upstream of the data processor which has caused the hold status is reduced. This suppresses occurrence of a new hold status, and reduces the power consumption of the upstream processing module. Note that when data is not output to the data processing modules on the downstream of the data processing module which has caused the hold status, the operating frequency of each downstream data processing module may be reduced in addition to the upstream data processing modules. In this case, since the number of data processing modules whose operating frequencies are to be reduced is increased, the power consumption can be further reduced.

<Other Embodiments>

In the aforementioned embodiments, the present invention uses the ring type pipeline processing circuit in the description. The present invention may be applied to line type pipeline processing in place of the ring type processing, thus obtaining the same effects. The present invention is not limited to the pipeline processing, and it may be applied to a circuit which divides processing parallelly and executes distributed processing in respective cores, thus obtaining the same effects. The present invention can be applied to a case in which a plurality of cores which have an input/output dependence execute processing in this way. The effects can be expected when the present invention is applied to at least two processing modules in place of all the processing modules. The response time controller 131 may have a quartz oscillator as a clock generator by itself, or may be a circuit which supplies, to the data processors, externally input clocks intact or after they are frequency-divided or multiplied by n. Alternatively, the response time controller 131 may be a circuit which decimates clocks at an appropriate ratio.

Settings of the optimized frequencies fn' may be stored in the response time controller 131 or a storage device outside the data processing subsystem, and the stored settings may be reflected at the second startup timing. In this case, such embodiment is applied to only a case in which the data processing subsystem executes the same processing. In the description of the above embodiments, the frequency-to-response time ratios are controlled to be closer to each other. Since the operation clocks and response time have a correlation, for example, a response time can be controlled to be longer by reducing the operation clocks. Therefore, power savings can be attained by reducing the frequency of the operation clocks to be supplied to at least one of the plurality of processing modules so that the plurality of measured response times become closer to each other.

According to the present invention, the power consumption can be reduced while suppressing the processing performance of a data processing circuit having multi-cores from lowering.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-026998, filed on Feb. 9, 2010 and 2010-252956, filed Nov. 11, 2010, which are hereby incorporated by reference herein in their entirety.

What is claimed is:

1. A data processing apparatus including a plurality of data processing units communicably connected in a ring pattern and configured to process data according to input operation clocks in order, the data processing apparatus comprising:
a processor for executing process steps, and a memory storing process steps executed by the processor, where the process steps cause the processor to function as:
a measuring unit configured to measure response times of said plurality of data processing units in case that the operation clocks of a common frequency are supplied to said plurality of data processing circuits;
a calculation unit configured to calculate frequency-to-response time ratios for respective data processing units, based on the response times measured by said measuring unit;
a determination unit configured to determine a data processing unit with minimum frequency-to-response time ratio based on the frequency-to-response time ratios calculated by said calculation unit; and
a controller configured to control each frequency of the operation clocks to be supplied to each data processing unit based on the minimum frequency-to-response time ratio.

2. A data processing apparatus in which a plurality of data processing circuits which execute data processing in a pre-set order are connected in a ring shape, comprising:
a processor for executing process steps, and a memory storing process steps executed by the processor, where the process steps cause the processor to function as:
a measurement unit configured to measure a response time of the data processing in association with each of the plurality of data processing circuits;
a calculation unit configured to calculate a frequency-to-response time ratio as a ratio of an operating frequency to the measured response time of the data processing circuit of interest in association with each of the plurality of data processing circuits; and
a controller configured to control the operating frequencies of the plurality of data processing circuits based on the calculated frequency-to-response time ratios,
wherein said controller controls the operating frequencies of other data processing circuits so that the frequency-to-response time ratios of other data processing circuits become closer to the frequency-to-response time ratio of the data processing circuit corresponding to the largest measured response time of the plurality of data processing circuits.

3. The apparatus according to claim 2, wherein said controller controls the operating frequencies of the plurality of data processing circuits based on the frequency-to-response time ratio when all of the plurality of data processing circuits operate at a same reference frequency.

4. The apparatus according to claim 3, wherein when the plurality of data processing circuits operate at the controlled operating frequencies, and when a hold status occurs in one of the data processing circuits, said controller controls the operating frequency of that data processing circuit to be the reference frequency until the hold status is released.

5. The apparatus according to claim 3, wherein when the plurality of data processing circuits operate at the controlled operating frequencies, and when a hold status occurs in one of the data processing circuits, said controller reduces the operating frequencies of the data processing circuits located on an upstream of the data processing circuit which has caused the hold status until the hold status is released.

6. The apparatus according to claim 3, further comprising:
a decision unit, implemented at least in part by hardware components of the apparatus, for deciding, when the plurality of data processing circuits operate at the controlled operating frequencies, and when a hold status occurs in one of the data processing circuits, an upper limit Fmax of an operable frequency of the data processing circuit which has caused the hold status,
wherein said controller controls the operating frequency of that data processing circuit to be the upper limit Fmax until the hold status is released.

7. The apparatus according to claim 3, further comprising:
a decision unit, implemented at least in part by hardware components of the apparatus, for deciding, when the plurality of data processing circuits operate at the controlled operating frequencies, and when a hold status occurs in one of the data processing circuits, an upper limit Fmax of an operable frequency of the data processing circuit which has caused the hold status,
wherein said controller replaces the reference frequency by the upper limit Fmax and reduces the operating frequencies of the data processing circuits located on an upstream of the data processing circuit which has caused the hold status until the hold status is released.

8. A control method of a data processing apparatus in which a plurality of data processing circuits which execute data processing in a pre-set order are connected in a ring shape, comprising:
a measurement step of controlling a measurement unit to measure a response time of the data processing in association with each of the plurality of data processing circuits;
a calculation step of controlling a calculation unit to calculate a frequency-to-response time ratio as a ratio of an operating frequency to the measured response time of the data processing circuit of interest in association with each of the plurality of data processing circuits; and
a control step of controlling a control unit to control the operating frequencies of the plurality of data processing circuits based on the calculated frequency-to-response time ratios,
wherein in the control step, the operating frequencies of other data processing circuits are controlled so that the frequency-to-response time ratios of other data processing circuits become closer to the frequency-to-response time ratio of the data processing circuit corresponding to the largest measured response time of the plurality of data processing circuits.

9. A method for a data processing apparatus including a plurality of data processing units communicably connected in a ring pattern and configured to process data according to input operation clocks in order, the method comprising:

measuring response times of said plurality of data processing units in case that the operation clocks of a common frequency are supplied to said plurality of data processing circuits;

calculating frequency-to-response time ratios for respective data processing units, based on the response times measured by said measuring unit;

determining a data processing unit with minimum frequency-to-response time ratio based on the frequency-to-response time ratios calculated in said calculation step; and controlling each frequency of the operation clocks to be supplied to each data processing unit based on the minimum frequency-to-response time ratio.

* * * * *